United States Patent [19]
Yokota et al.

[11] Patent Number: 5,285,437
[45] Date of Patent: Feb. 8, 1994

[54] AUDIO DEVICE HAVING CONTROL FUNCTION WITH USE OF CARD

[75] Inventors: Tokuo Yokota, Neyagawa; Keimi Fukui, Sakai; Katsuyuki Matsumoto, Shijonawate, all of Japan

[73] Assignee: Sanyo Electric Co., Ltd., Osaka, Japan

[21] Appl. No.: 712,274

[22] Filed: Jun. 11, 1991

[30] Foreign Application Priority Data

| Jun. 12, 1990 | [JP] | Japan | 2-154671 |
| Dec. 12, 1990 | [JP] | Japan | 2-401669 |
| Jan. 16, 1991 | [JP] | Japan | 3-3184 |

[51] Int. Cl.⁵ .................................................. G11B 7/00
[52] U.S. Cl. .................................................. 369/64
[58] Field of Search ............... 369/48, 49, 52, 63, 369/64, 31; 360/2; 235/462, 375; 434/339, 337, 311, 315, 316, 318, 335

[56] References Cited

U.S. PATENT DOCUMENTS

| 3,488,867 | 1/1970 | Lyon et al. | 360/2 |
| 3,648,385 | 3/1972 | Barlow et al. | 235/462 |
| 4,216,506 | 8/1980 | Ludtke et al. | 360/2 |
| 4,288,825 | 9/1981 | Hasuo et al. | 360/2 |
| 4,337,375 | 6/1982 | Freeman | 235/462 |
| 4,403,965 | 9/1983 | Hawkins | 434/339 |
| 4,411,628 | 10/1983 | Laughon et al. | 434/335 |
| 4,425,099 | 1/1984 | Naden | 235/462 |
| 4,481,412 | 11/1984 | Fields | 235/462 |
| 4,602,152 | 7/1986 | Dittakavi | 235/462 |
| 4,831,610 | 5/1989 | Hoda et al. | 369/48 |

FOREIGN PATENT DOCUMENTS 52-34366 9/1977 Japan.
62-57234 4/1987 Japan.

Primary Examiner—Donald E. McElheny, Jr.
Attorney, Agent, or Firm—Nikaido, Marmelstein, Murray & Oram

[57] ABSTRACT

An audio device controllable with a card having at least one operation identifying device related to a specific reproduction operation. The card is provided on the respective surfaces thereof with first and second items of visual data corresponding to the reproduction operation. The audio device has a card inlet, an optical sensor for detecting the mark of the card, and a system controller for controlling the device to realize the reproduction operation identified by the mark.

14 Claims, 6 Drawing Sheets

AUDIO DEVICE HAVING CONTROL FUNCTION WITH USE OF CARD

FIELD OF THE INVENTION

The present invention relates to an audio device for reproducing sound data from recording media such as compact discs (hereinafter referred to as "CDs"), and more particularly to an audio device which is controllable for the reproduction of sound data with use of a card having an operation identification mark.

BACKGROUND OF THE INVENTION

When a desired piece of music is to be selected from among those recorded on a CD for reproduction on a CD player, the music is selected generally by manipulating the operation panel on the body of the CD player to give a track skip command, or by manipulating some of the number entry keys on a remote control unit and thereby directly specifying the track number of the desired music.

Such a selection-reproduction system is relatively easy for the adult to use but is difficult for the infant to manipulate.

Further CD players are adapted for various special reproduction operations including an introduction reproducing operation to successively reproduce only the beginning portions of the pieces of music on the CD, each for several seconds, a random reproduction operation to reproduce all the pieces of music on the CD randomly, and a repeat reproduction operation to repeatedly reproduce all the pieces of music on the CD or the specified one of them. In this case, an increase in the number of operation buttons or in the number of manipulation procedures makes the player more difficult to use for the infant.

SUMMARY OF THE INVENTION

An object of the present invention is to provide an audio device which readily permits even infants to select and reproduce the desired one of items of sound data recorded on a recording medium and to set the device for a desired mode of reproduction such as a special reproduction operation.

The present invention provides an audio device having a control function with use of cards which comprises:

a card having at least one operation identifying means related to a specific reproduction operation and bearing on the respective surfaces first and second items of visual data in accordance with the content of the reproduction operation, a card inlet for the user to insert thereinto the card portion having the operation identifying means, sensor means for detecting the operation identifying means of the card inserted in the inlet to produce an identifying signal in accordance with the result of detection, and control means for recognizing the reproduction operation identified by the operation identifying means based on the identifying signal from the sensor means and effecting control to realize the reproduction operation.

When sound data is to be reproduced from a recording medium with use of the audio device, the user selects a particular card bearing the first or second item of visual data corresponding to the desired reproduction operation and then inserts the card into the card inlet of the device. The first or second item of visual data is, for example, in the form of a message, picture or the like which apparently indicates the content of the reproduction operation. This enables even an infant to easily select the particular card with reference to the visual data.

The sensor means detects the operation identifying means of the card and feeds to the control means an identifying signal in accordance with the result of detection. Consequently, the control means recognizes the reproduction operation identified by the operation identifying means, and then controls the device to realize the reproduction operation. Thus, the device performs the desired reproduction operation.

The present invention further provides an audio device having a control function with use of cards which comprises:

a card having an operation identifying means related to index data as to an item of sound data, bearing on one of its opposite surfaces a first item of visual data in accordance with the meaning and content of the sound data and bearing on the other surface thereof a second item of visual data in accordance with the meaning and content of the sound data, a card inlet for the user to insert thereinto the card portion having the operation identifying means with the first or second item of visual data facing to the front, sensor means for detecting the operation identifying means of the card inserted in the inlet to produce an identifying signal in accordance with the result of detection, and control means for recognizing the index data in accordance with the operation identifying means of the card based on the identifying signal from the sensor means to retrieve the item of sound data specified by the index data and effecting control to reproduce the retrieved sound data.

When the desired item of sound data is to be selected from among those on a recording medium for the reproduction of the sound data with use of the audio device, the user selects a particular card bearing the first and second items of visual data corresponding to the sound data, and inserts the card into the card inlet of the device. For example, the first item of visual data is such that it is readily understood like a picture representing the content of the sound data. Even an infant is then able to readily select the particular card with reference to the visual data.

The sensor means detects the operation identifying means of the card and feeds to the control means an identifying signal in accordance with the result of detection. Consequently, the control means recognizes the index data in accordance with the operation identifying means of the card, retrieves the item on sound data specified by the index data, and thereafter controls the device to reproduce the retrieved sound data. In this way, the device reproduces the desired sound data. In this case, the second item of visual data, for example, can be in the form of a message indicating or representing the content of the sound data, i.e., somewhat more sophisticated data. The visual data then serves to assist the sound data.

The present invention further provides an audio device having a control function with use of cards which comprises:

a card having a first operation identifying means related to a first special reproducing operation and a second operation identifying means related to a second special reproducing operation, bearing on one of its opposite surfaces a first item of visual data representing the content of the first special reproducing operation and bearing on the other surface thereof a second item of visual data representing the content of the second special reproducing operation, a card inlet for the user to insert thereinto the card portion having the first and second operation identifying means with the first or second item of visual data facing to the front, sensor means for detecting the first or second operation identifying means of the card inserted in the inlet corresponding to the front-facing item of visual data to produce an identifying signal in accordance with the result of detection, and control means for recognizing the special reproducing operation identified by the first or second operation identifying means based on the identifying signal from the sensor means and effecting control to realize the special reproducing operation.

When sound data is to be reproduced from a recording medium by a desired special reproducing operation with use of the audio device, the user selects a particular card which bears the first or second item of visual data corresponding to the special reproducing operation, and inserts the selected card into the card inlet of the device with the visual data corresponding to the desired special reproducing operation facing to the front. The visual data is, for example, in the form of a message which readily indicates the content of the special reproducing operation. Even an infant can then easily select the card with reference to the visual data.

Of the first and second operation identifying means of the card, the operation identifying means corresponding to the item of visual data on the front side is detected by the sensor means, whereupon the sensor means feeds an identifying signal to the control means in accordance with the result of detection. Consequently, the control means recognizes the special reproducing operation identified by the operation identifying means, and thereafter controls the device to realize the special reproducing operation. Thus, the desired special reproduction operation is performed.

When the card is inserted into the inlet of the device as reversed, the special reproducing operation corresponding to the other item of visual data on the front side is conducted.

DETAILED DESCRIPTION OF EMBODIMENT

A CD player embodying the invention for infants will be described below with reference to the drawings.

Figure 1:
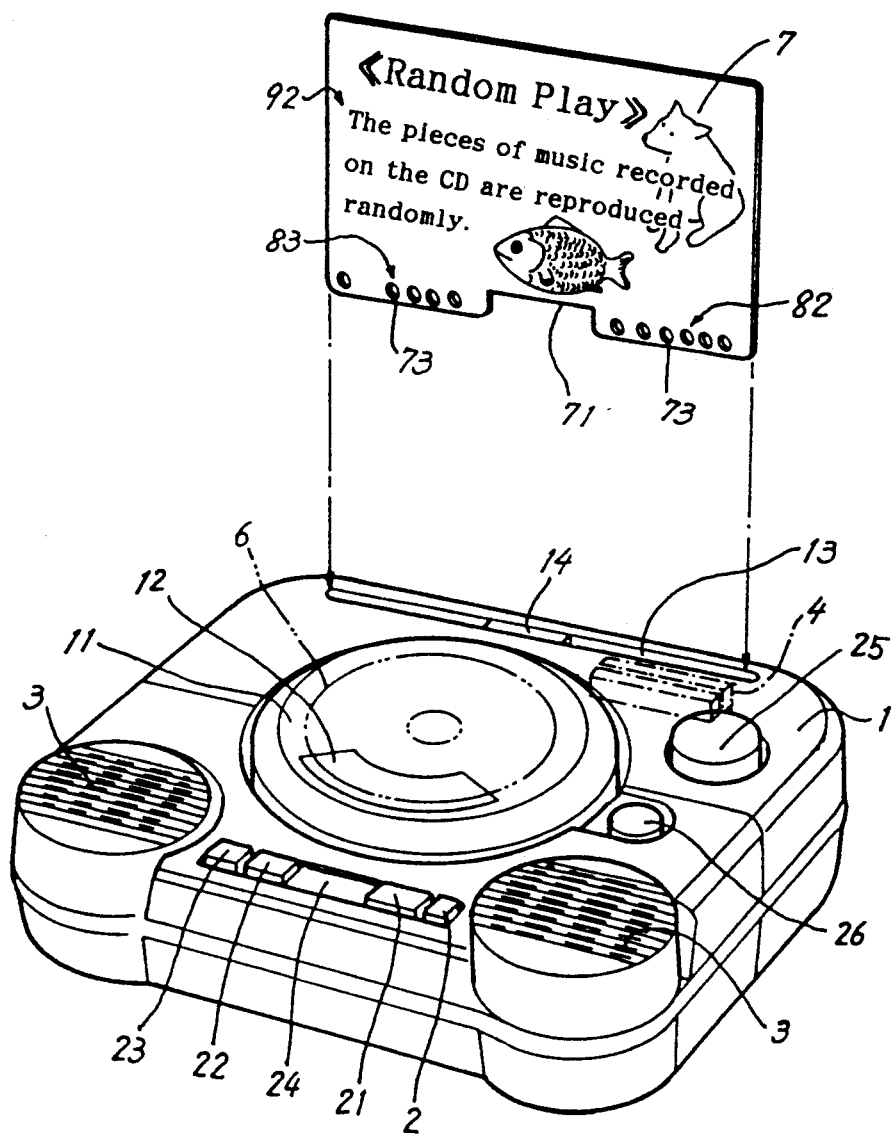
FIG. 1 is a perspective view showing the appearance of a CD player embodying the invention.

As seen in FIG. 1, a disc cover 11 having a transparent window 12 is openably attached to the central portion of the upper side of cabinet 1 of the CD player. A CD 6 can be set in a signal reproduction position within the cabinet 1 when the disc cover 11 is opened by a cover opening button 26. One CD 6 has recorded thereon several tens of children's songs or nursery songs, which include those having an accompaniment only.

Like conventional CD players, the cabinet 1 is provided at the front end of its upper side with a stop button 2, reproduction button 21, forward skip button 22 and a reverse skip button 23, and further with a display portion 24 for indicating the track number of the music being played.

A pair of speakers 3, 3 are arranged respectively at the right and left ends of the cabinet 1. The sound volume of these speakers is adjustable by manipulating a volume knob 25.

The cabinet 1 is further provided in the rear end of its upper side with a card inlet 13 for inserting various cards 7 thereinto as will be described later. Provided inside the cabinet 1 is an optical sensor 4 reading an operation identifying means 82 of the inserted card 7. The card 7 comprises one hole 73 or an arrangement of holes 73 formed in the lower end of the card 7. Presence or absence of the hole 73 represents binary data. Accordingly, the presence or absence of holes 73, which are, for example, up to 6 in number, indicates $2^6$ items of data. The data is used for specifying the track number of one of pieces of music recorded on the CD 6, or for specifying data for setting the player in one of special reproduction modes.

Figure 2:
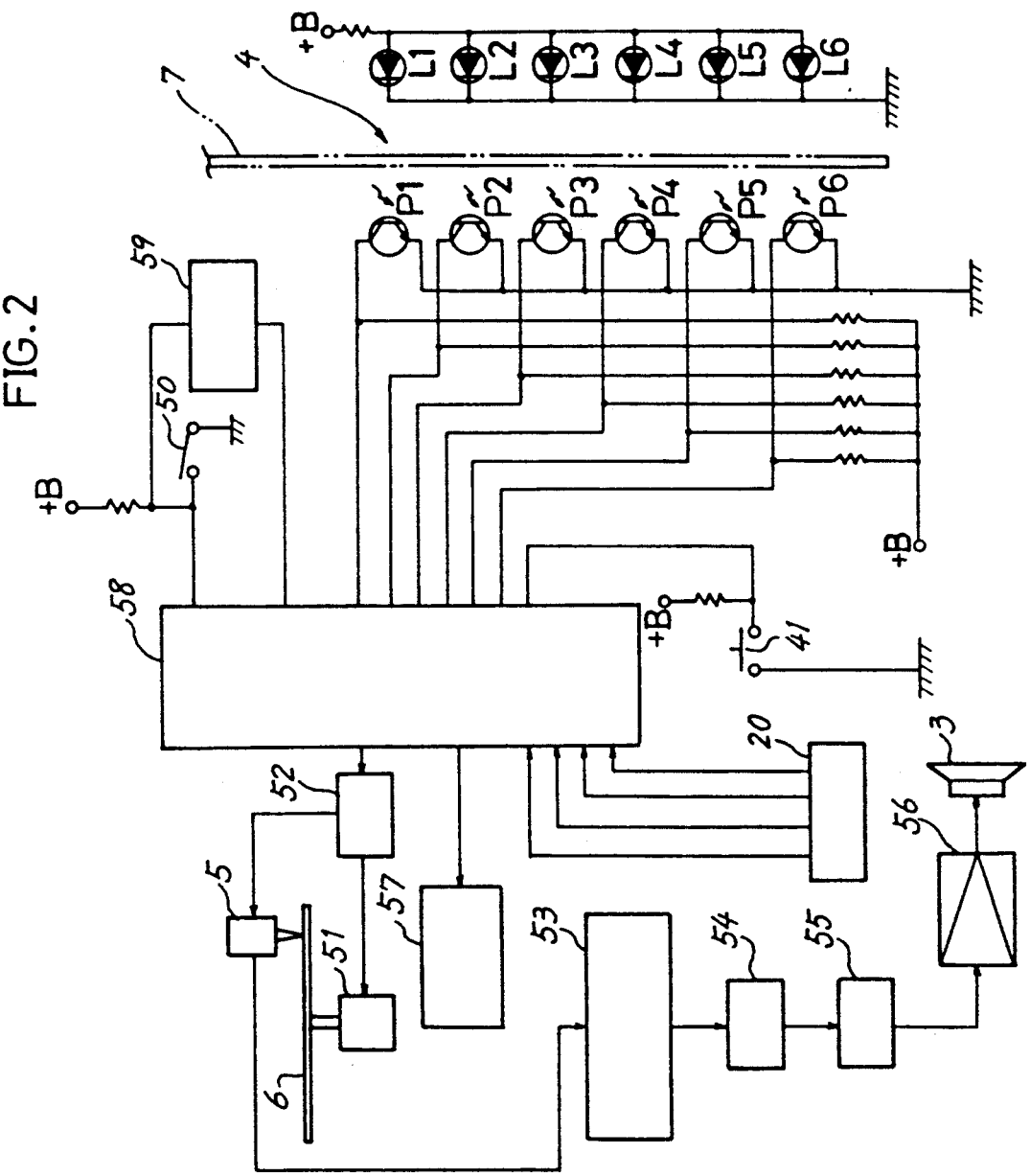
FIG. 2 is a block diagram showing the internal construction of the CD player.

With reference to FIG. 2, the cabinet 1 has inside thereof a disc drive motor 51, and a pickup 5 for reading signals from the CD 6 driven by the motor. The rotation of the motor 51 is controlled by a servo control circuit 52.

The signal read by the pickup 5 is demodulated by a signal processing circuit 53 and then converted from digital signal to analog signal by a D/A converter 54. The analog signal is passed through a filter 55 for the removal of components of undesired band, thereafter amplified by a signal amplifier 56 and fed to the speakers 3.

A system controller 58 controls the operation of the servo control circuit 52 and a display circuit 57, and the overall operation of the CD player. An operation unit 20 including the stop button 2, reproduction button 21 and like operation buttons feeds signals to the system controller 58.

As illustrated, the optical sensor 4 comprises a plurality of light-emitting diodes L1 to L6 each having an anode for the application of voltage +B and a grounded cathode, and a plurality of phototransistors P1 to P6 opposed to the respective diodes for photoelectrically converting the light from the diodes. The pairs of light-emitting diodes and phototransistors opposed thereto correspond in number to the number of holes providing the operation identifying means of the card 7. Voltage +B is applied to the collectors of these phototransistors P1 to P6. These collectors are connected to input ports of the system controller 58, and the emitters are grounded.

While no card is inserted in the inlet 13, the light from the diodes impinges on the phototransistors, which are therefore on.

A card detecting switch 41 is provided for detecting the card 7 inserted into the card inlet 13. The switch feeds a signal to the system controller 58.

When the disc cover 11 is opened, this is interpreted as indicating a change of disc by a cover opening detecting switch 50 and a reset circuit 59. More specifically, the switch 50 detects the opening of the disc cover 11, whereupon the switch operates the reset circuit 59, which in turn resets the system controller 58.

Figure 3:
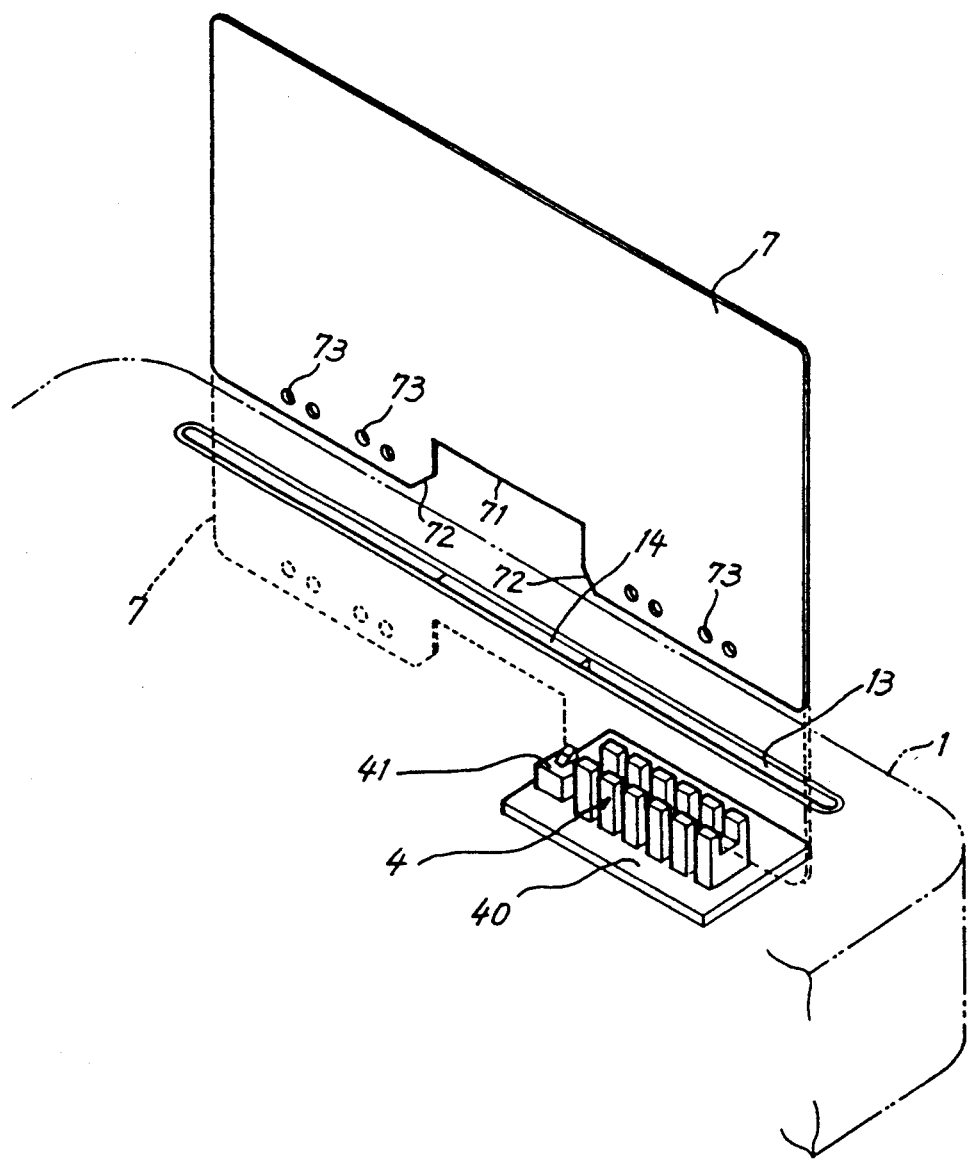
FIG. 3 is a perspective view showing an optical sensor as installed in position.

As shown in FIG. 3, the card 7 is rectangular and has a cutout 71 in the midportion of its lower side or edge. On the other hand, the card inlet 13 of the cabinet 1 is centrally provided with a positioning rib 14 adapted to snugly fit in the cutout 71. The card has at each end of the cutout 71 a slanting guide portion 72 for permitting the card to readily fit to the positioning rib 14.

The optical sensor 4 and the card detecting switch 41 are mounted on a printed wiring board 40 and disposed in the inward portion of the cabinet at the right side of the rib 14 in the card inlet 13. The pairs of light-emitting diodes and phototransistors providing the optical sensor 4 are arranged in corresponding relation with the respective positions of holes 73 in the card 7. The card detecting switch 41 is positioned inwardly of the optical sensor 4 and close to the positioning rib 14.

Figure 4:
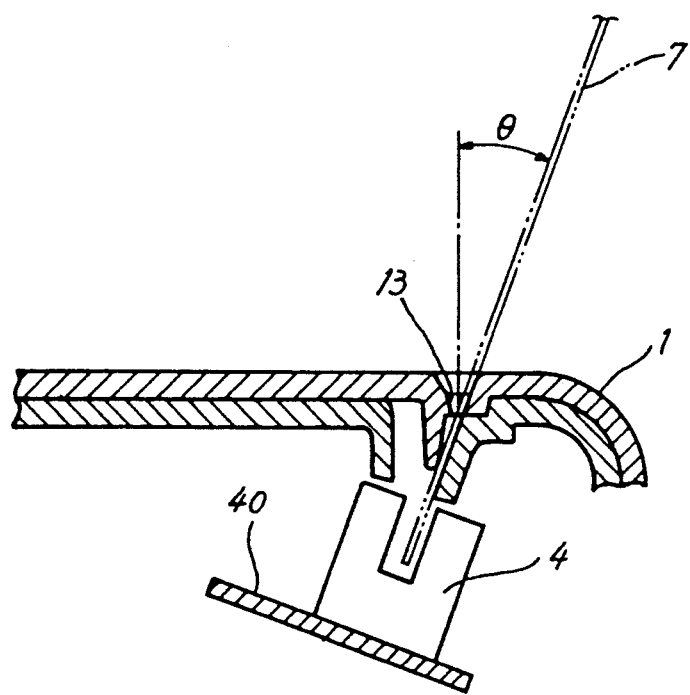
FIG. 4 is a sectional view of a card inlet formed in the cabinet of the player.

As seen in FIG. 4, the card inlet 13 is so formed that the card 7 is inserted in an inclined direction so as to be retainable at an angle of retraction $\theta$ (e.g., 20 degrees).

When the card 7 is inserted into the inlet 13 as indicated in a broken line in FIG. 3, the cutout portion 71 fits to the positioning rib 14, whereby the card 7 is accurately positioned with respect to the vertical and lateral directions. The rib 14 obviates the likelihood that the card 7 will be inserted as turned upwise down into the inlet 13. Consequently, the row of holes 73 formed in the card 7 at the right side of the cutout 71 is positioned between the light-emitting diodes of the sensor 4 and the phototransistors thereof, turning on or off the phototransistor in accordance with the absence or presence of the hole 73. At the same time, the card detecting switch 41 functions for the system controller 58 of FIG. 2 to detect the insertion of the card 7.

The card detecting switch 71 is disposed close to the center of the inlet 13 of the cabinet 1 as seen in FIG. 3, so that even if the card is inserted, as slightly inclined rightwardly downward, into the inlet, the switch 41 functions eventually when the card 7 has been completely inserted into the inlet 13. Accordingly, there is no likelihood that the holes 73 of the card 7 will be detected before the holes 73 reach the detecting position of the optical sensor 4. This eliminates detection errors of the optical sensor 4.

Of the plurality of phototransistors constituting the optical sensor 4, one or more phototransistors opposed to the holes 73 in the card 7 receive light from the corresponding diodes and remain in conduction, whereas the other phototransistors are turned off by the card which blocks the light from the corresponding diodes.

The system controller 58 receives on-off signals (identifying signals) from the phototransistors, processes the signals as binary data, recognizes the reproduction operation represented by the data, and controls the player for the specified reproduction operation.

Incidentally, the optical sensor 4 is adapted to operate for a predetermined period of time after the operation of the card detecting switch 41 to assure the light-emitting diodes of a prolonged life. During this period, the system controller 58 repeatedly performs an operation to sample the on and off states of the optical sensor 4 with a specified period and compares the result of the latest sampling cycle with the result of the sampling cycle immediate before the latest. Insofar as the two results are in match, the controller accepts the result as an identifying signal. If otherwise, the result is treated as a detection error. This serves to eliminate detection errors of the optical sensor 4.

In the event of occurrence of a detection error, the system controller 58 causes the display portion 24 to show "00" and the speakers 3 to produce an alarm, notifying the user of the occurrence of the detection error and urging the user to reinsert the card 7.

When the identifying signal has been accepted, the content of the signal is stored to continue the reproduction operation even if the card 7 is removed from the cabinet 1.

While no card 7 is inserted, the circuit of FIG. 2 is set in a stand-by mode in which the operation of the circuit is limited to a minimum essential extent involving retention of data in the system controller, operation of the optical sensor 4 and reset circuit 59, etc. to minimize the power consumption. It is upon insertion of the card 7 that the player is brought into a reproduction mode in which the circuit of FIG. 2 is operated in its entirety. When the specified piece or pieces of music have been completely reproduced, the player automatically returns to the stand-by mode.

Figure 5A:
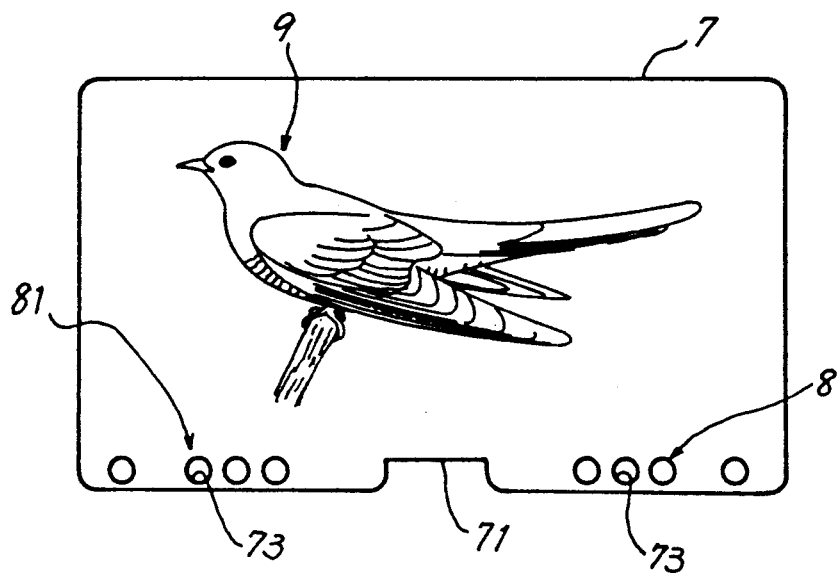
FIG. 5A is a plan view showing one surface of a card having selection identifying marks.
Figure 5B:
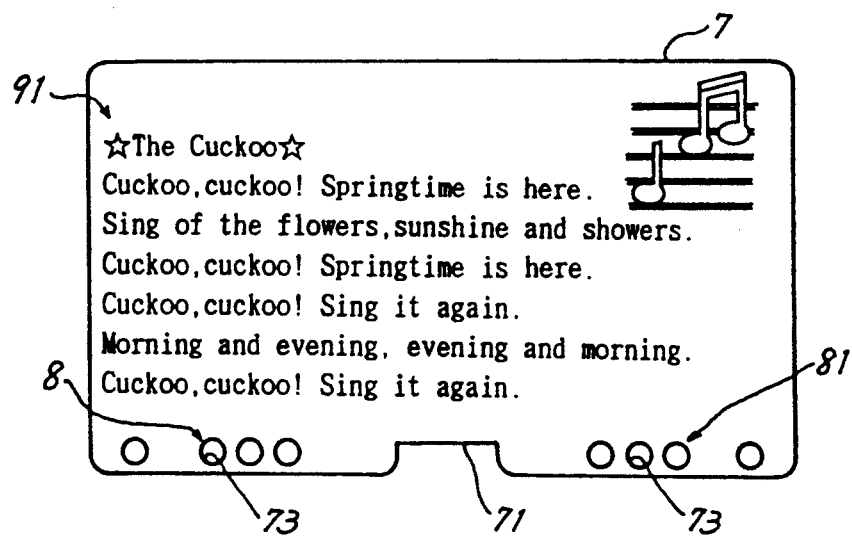
FIG. 5B is a plan view showing the other surface of the card.

FIGS. 5A and 5B show a card 7 for selecting and reproducing one of the pieces of music recorded on the CD. One of the surfaces of the card 7 bears a picture 9 corresponding to the piece of music to be reproduced, and the other surface bears the text 91 of the music printed thereon.

The card 7 has at opposite sides of the cutout 71 a pair of selection identifying marks 8, 81 representing the same content. One hole 74 or a row of holes 73 providing each of the selection identifying marks 8, 81 is disposed along the lower edge of the card 7 on each side of the vertical center line of the card 7, symmetrically with respect to this line. FIG. 5A shows the card 7 with the picture 9 facing to the front and with the mark 8 at the right side. FIG. 5B shows the same card 7 with the text 91 facing to the front and with the mark 81 at the right side. These two marks 8, 81 represent the same binary data, i.e., the same track number.

Consequently, when the card 7 is inserted into the inlet 13 of the cabinet 1 shown in FIG. 1 with either surface facing to the front, the same piece of music is selected and reproduced.

Such a card is prepared for each of the pieces of music recorded on the CD.

When the desired piece of music is to be reproduced, the corresponding card 7 can be selected with reference to the picture. Since the music can be selected and reproduced merely by inserting the card 7 into the inlet 13, the procedure is easy even for the infant.

Further if the card 7 is inserted into the inlet 13 with the text 91 on the front side, the user can sing the song to the reproduced music. Since the card 7 is held to the cabinet 1 at a suitable angle of retraction as already stated, the text 91 is easy to read.

Figure 6A:
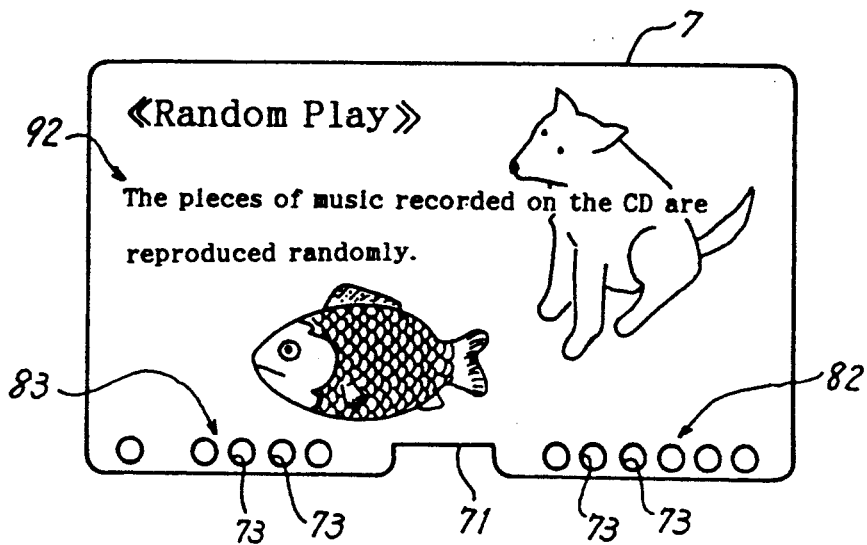
FIG. 6A is a plan view showing one surface of a card having reproducing operation identifying means.
Figure 6B:
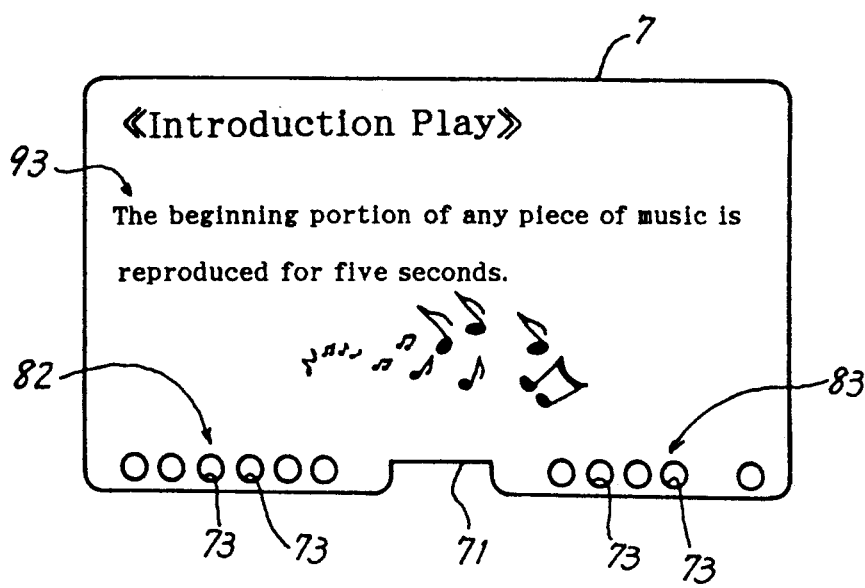
FIG. 6B is a plan view showing the other surface of the card.

FIGS. 6A and 6B show a card 7 for setting special reproduction modes. The card has a message 92 printed on one surface for instructions for random reproduction of the recorded pieces of music (random play), and a message 93 on the other surface for instructions for reproduction of the introduction of each piece (introduction play).

The card 7 has first and second reproducing operation identifying means 82, 83 at the respective sides of the cutout 71. The first operation identifying means 82 representing the random play is positioned on the right side of the card 7 when the random play message 92 is faced to the front as seen in FIG. 6A. The second operation identifying means 83 representing the introduction play is positioned on the right side of the card 7 when the message 93 for the introduction play is faced to the front as seen in FIG. 6B.

Such cards 7 are prepared for a plurality of special reproduction modes including the random play, introduction play, repeat play, etc., each card for two special reproduction modes.

When the desired one of special reproduction modes is to be realized, the corresponding card 7 can be selected with reference to the messages 92, 93. The player can be set for the desired special reproduction mode and for reproducing operation in this mode merely by inserting the card 7 into the inlet 13 with the message for the desired mode on the front side. This procedure is easy for infants.

The use of the card 7 shown in FIGS. 6A and 6B eliminates the need to provide on the body of the CD player operation buttons for setting the special reproduction modes and is therefore advantageous in rendering the device less costly and compacter.

The music selecting card 7 shown in FIGS. 5A and 5B may alternatively be such that the selection identifying marks 8, 81 are made to represent different contents. The single card 7 is then usable for selecting two pieces of music.

Further the card 7 for special reproduction shown in FIGS. 6A and 6B can alternatively be such that for example, the two marks 82, 83 are made to represent the same content. A message and a picture corresponding to the special reproducing operation to be realized are then provided on the respective surfaces of the card.

The description of the foregoing embodiment is intended for the illustration of the present invention and should not be interpreted as restricting the invention as defined in the appended claims or reducing the scope of the invention. Further the construction of the device of the invention is not limited to that of the embodiment but can of course be modified variously by one skilled in the art within the scope of the invention.

For example, the recording media are not limited to CDs, but magnetic discs, IC memories and various known media are usable. The sound data is not limited to music but may be sound or voice telling fairly tales or for use in education.

What is claimed is:

1. An audio device controllable with cards for reproducing a plurality of items of sound data, said audio device comprising:
   a card having at a lower end thereof at least one operation identifying means related to a specific reproduction operation and said card bearing on respective surfaces first and second items of visual data in accordance with content of the reproduction operation;
   a card inlet formed long and narrow on an upper side of a cabinet for inserting thereinto said lower end of said card;
   card holding means, provided in said cabinet, for holding said card, inserted in said card inlet, in a standing position;
   sensor means for detecting said operation identifying means of said card, inserted in said card inlet, to produce an identifying signal in accordance with results of the detection; and
   control means for recognizing said specific reproduction operation identified by said operation identifying means based on said identifying signal from said sensor means and effecting control to realize said specific reproduction operation.

2. The audio device as defined in claim 1 wherein said first and second items of visual data are each in a form of characters and/or a picture and are different in content.

3. The audio device as defined in claim 1 wherein said card is rectangular, said operation identifying means is binary data represented by one hole or a row of a plurality of holes formed in said card, and said sensor means has an optical sensor for detecting a group of holes constituting said operation identifying means.

4. An audio device controllable with cards for reproducing a plurality of items of sound data from a recording medium having recorded therein said sound data and index data therefor, said audio device comprising:
   a card having at a lower end thereof an operation identifying means related to said index data as to one of said items of sound data, said card bearing on one of its opposite surfaces a first item of visual data in accordance with meaning and content of said sound data and said card bearing on another surface thereof a second item of visual data in accordance with meaning and content of said sound data;
   a card inlet formed long and narrow on an upper side of a cabinet for inserting thereinto said lower end of said card with said first or second item of visual data facing to a front;
   card holding means, provided in said cabinet, for holding said card, inserted in said card inlet, in a standing position;
   sensor means for detecting said operation identifying means of said card, inserted in said card inlet, to produce an identifying signal in accordance with results of the detection; and
   control means for recognizing said index data in accordance with said operation identifying means of said card based on said identifying signal from said sensor means to retrieve said item of sound data specified by said index data and effecting control to reproduce retrieved sound data.

5. The audio device as defined in claim 4 wherein said first item of visual data includes at least characters, and said second item of visual data includes at least a picture.

6. The audio device as defined in claim 4 wherein said first item of visual data is text and/or score of a piece of music recorded on said recording medium, and said second item of visual data is a picture corresponding to content of text of said music.

7. The audio device as defined in claim 4 wherein said card is rectangular, and said operation identifying means is a binary data represented by one hole or a row of a plurality of holes formed in said card, a group of holes providing said operation identifying means being formed along a lower edge of said card at each of right and left ends of said card, right and left groups of holes being arranged symmetrically with respect to a center line of said card.

8. The audio device as defined in claim 7 wherein said sensor means has an optical sensor for detecting said group of holes constituting a mark.

9. An audio device controllable with cards for reproducing a plurality of items of sound data from a recording medium, said audio device comprising:
   a card having at a lower end thereof a first operation identifying means related to a first special reproducing operation and a second operation identifying means related to a second special reproducing operation, said card bearing on one of its opposite surfaces a first item of visual data representing content of said first special reproducing operation and said card bearing on the other surface thereof a second item of visual data representing content of said second special reproducing operation;
   a card inlet formed long and narrow on an upper side of a cabinet for inserting thereinto said lower end of said card with said first or second item of visual data facing to a front;
   card holding means, provided in said cabinet, for holding said card, inserted in said card inlet, in a standing position;
   sensor means for detecting said first or second operation identifying means of said card, inserted in said card inlet, corresponding to a front-facing item of visual data to produce an identifying signal in accordance with results of the detection; and
   control means for recognizing said special reproducing operation identified by said first or second operation identifying means based on said identifying signal from said sensor means and effecting control to realize special reproducing operation.

10. An audio device as defined in claim 9 wherein said card is rectangular, and each of said first and second operation identifying means is a binary data represented by one hole or a row of a plurality of holes formed in said card, a group of holes providing said first operation identifying means being formed along a lower edge of said card at one of right and left ends of said card when said item of visual data corresponding to said first operation identifying means is faced to said front, said holes providing said second operation identifying means being formed along said lower edge of the card at said one end of said card when said item of visual data corresponding to said second operation identifying means is faced to said front.

11. The audio device as defined in claim 10 wherein said sensor means has an optical sensor for detecting said group of holes constituting the first or second operation identifying means.

12. The audio device as defined in claim 1 wherein said card is rectangular and has a cutout in a midportion of a lower edge, and said card inlet is centrally provided with a positioning rib adapted to snugly fit in said cutout.

13. The audio device as defined in claim 4 wherein said card is rectangular and has a cutout in a midportion of a lower edge, and said card inlet is centrally provided with a positioning rib adapted to snugly fit in said cutout.

14. The audio device as defined in claim 9 wherein said card is rectangular and has a cutout in a midportion of a lower edge, and said card inlet is centrally provided with a positioning rib adapted to snugly fit in said cutout.

* * * * *